(12) United States Patent
Wang et al.

(10) Patent No.: US 7,594,303 B2
(45) Date of Patent: *Sep. 29, 2009

(54) HINGE MECHANISM AND ELECTRONIC APPARATUS USING THE SAME

(75) Inventors: He-Li Wang, Guangdong (CN); Xiang-Hui Zhang, Guangdong (CN); Wen-Jie Bao, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 485 days.

This patent is subject to a terminal disclaimer.

(21) Appl. No.: 11/306,443

(22) Filed: Dec. 28, 2005

(65) Prior Publication Data

US 2006/0282984 A1 Dec. 21, 2006

(30) Foreign Application Priority Data

Jun. 18, 2005 (CN) .................... 2005 1 0035443

(51) Int. Cl.
*E05F 1/08* (2006.01)

(52) U.S. Cl. ............................ 16/297; 16/308; 16/382; 720/612; 720/655

(58) Field of Classification Search ............ 16/297, 16/289, 307, 308, 306, 256, 270, 257, 263, 16/262; 379/433.12, 433.13; 361/679, 680–683; 720/655, 694, 638, 612; 206/307, 308.1, 206/309–311; 220/845, 847, 848, 837, 842, 220/4.22

See application file for complete search history.

(56) References Cited

U.S. PATENT DOCUMENTS

| 2,557,048 A * | 6/1951 | Haase ................... 220/830 |
| 3,580,412 A * | 5/1971 | Weiss ................... 220/830 |
| 4,356,594 A * | 11/1982 | Grosemans ............... 16/256 |
| 4,458,379 A * | 7/1984 | Shelton .................. 16/297 |
| 4,513,877 A * | 4/1985 | Taguchi et al. ............ 220/830 |
| 4,524,438 A * | 6/1985 | Einhaus ................ 369/75.11 |
| 6,231,021 B1 * | 5/2001 | Hong .................... 248/371 |
| 6,871,383 B2 | 3/2005 | Huang |
| 2005/0229195 A1 * | 10/2005 | Liu ..................... 720/655 |
| 2006/0198512 A1 * | 9/2006 | Zhitao et al. ........... 379/433.13 |

FOREIGN PATENT DOCUMENTS

| CN | 2447902 Y | 9/2001 |
| JP | 2002-335316 | 11/2002 |
| TW | 388597 | 4/2000 |
| TW | 430236 | 4/2001 |
| TW | 536125 | 6/2003 |

* cited by examiner

*Primary Examiner*—Chuck Y. Mah
(74) *Attorney, Agent, or Firm*—Winston Hsu

(57) ABSTRACT

An electronic apparatus includes a first body, a second body, a pivot set for hinging the second body to the first body and a torsion spring. The pivot set includes a pivot seat and a pivot extending from the pivot seat. The pivot seat is detachably secured to the first body. The pivot rotatably extends into the second body. The torsion spring includes a fixing end thereof fixed to the second body, and a sliding end thereof slidably pressing against the first body.

16 Claims, 5 Drawing Sheets

HINGE MECHANISM AND ELECTRONIC APPARATUS USING THE SAME

FIELD OF THE INVENTION

The present invention generally relates to a hinge mechanism and an electronic apparatus using the same, and more particularly, to a hinge mechanism for a portable electronic apparatus with a flip type lid.

DESCRIPTION OF RELATED ART

In recent years, various kinds of portable electronic devices have come into widespread use, such as mobile phones, portable computers, electronic notebooks, electronic media players and the like.

With these portable electronic devices, sometimes flip lids are provided to open and close the portable electronic devices. For example, a portable media player, which is a typical example of such portable electronic devices, generally has a main body and a flip lid pivotably attached to the main body. The flip lid can be opened and closed, for unloading and loading of an optical disk from and onto the main body. For this type of portable electronic device equipped with the above described flip lid, there is a demand to provide a hinge mechanism to perform opening and closing of the flip lid.

Referring to FIG. 5, a typical hinge mechanism for a portable electronic device 100 is illustrated. The portable electronic device 100 includes a main body 200, a rotatable body 300, and a hinge mechanism 400 pivotably connecting the rotatable body 300 to the main body 200. A sleeve 401 with a through hole 404 extends from an edge of the main body 200. A pivot 406 extending from a corresponding edge of the rotatable body 300 is received in the through hole 404. A torsion spring 403 is sleeved on an extremity of the pivot 406, with an end thereof fixed in the pivot 406 and the other end thereof fixed in the main body 200. A torsion force provided by the torsion spring 403 is employed on the rotatable body 300 and makes the rotatable body 300 rotate away from the main body 200 in a free state without external forces. When closing the rotatable body 300, an external force is applied to the rotatable body 300 and makes the rotatable body 300 cover on the main body 200. At the same time, the rotatable body 300 is locked by a locking mechanism (not shown).

As described above, the pivot 406 of the hinge mechanism 400 is under stress at all times, whether the portable electronic device 100 is open or not. Therefore, the pivot 406 tends to break easily from use unless very strong, therefore expensive, parts are used.

Accordingly, a need exists for a hinge mechanism for an electronic apparatus in the industry to address the aforementioned deficiencies and inadequacies.

SUMMARY OF INVENTION

An electronic apparatus comprises a first body, a second body, a pivot set for hinging the second body to the first body and a torsion spring. The pivot set comprises a pivot seat and a pivot extending from the pivot seat. The pivot seat is detachably secured to the first body. The pivot rotatably extends into the second body. The torsion spring comprises a fixing end thereof fixed to the second body, and a sliding end thereof slidably pressing against the first body.

Other systems, methods, features, and advantages of the present hinge mechanism and the electronic apparatus will be or become apparent to one with skill in the art upon examination of the following drawings and detailed description. It is intended that all such additional systems, methods, features, and advantages be included within this description, be within the scope of the present apparatus, and be protected by the accompanying claims.

BRIEF DESCRIPTION OF DRAWINGS

Many aspects of the present hinge mechanism and the present electronic apparatus can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

DETAILED DESCRIPTION

Figure 1:
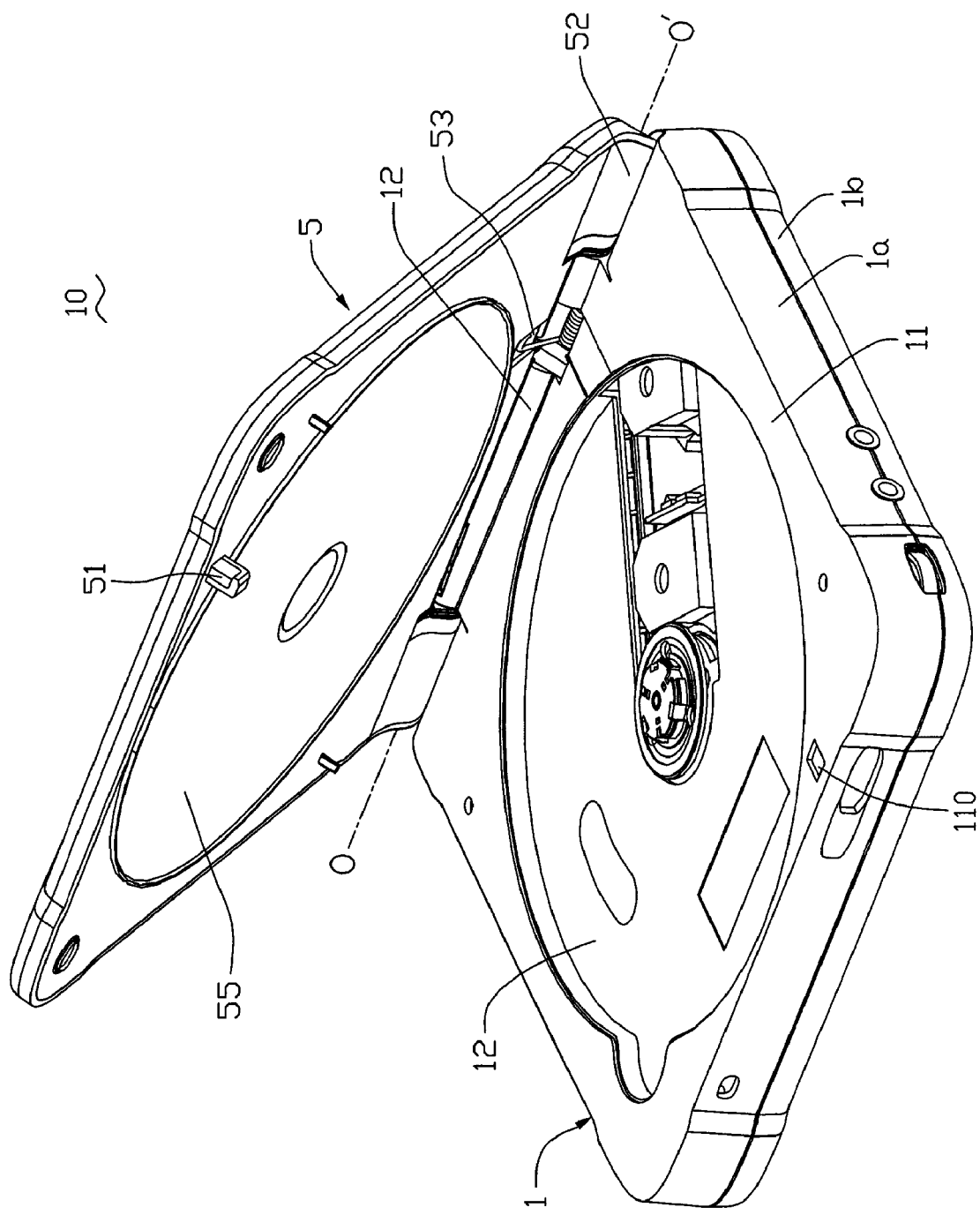
FIG. 1 is an isometric view of a portable media player in accordance with an exemplary embodiment of the present invention, the portable media player comprising a main body, an upper housing portion, a first pivot set, and a second pivot set.

Reference will now be made to the drawing figures to describe the preferred embodiments of the present hinge mechanism and the present electronic apparatus, in detail.

Referring to FIG. 1, a portable media player 10 is illustrated to set up an exemplary embodiment of the present invention. The portable media player 10 includes a main body 1, a first pivot set 2, a second pivot set 3 (also referring to FIG. 2), and a top lid 5. The first and second pivot sets 2, 3 are coaxially positioned at a rear edge of the main body 1 and a corresponding rear edge of the top lid 5, so that the top lid 5 is rotatable relative to the main body 1 around an axis OO' which is defined by the first and second pivot sets 2, 3.

The main body 1 includes a substantially rectangular housing comprising upper and lower housing portions 1a, 1b coupled together. Most modules and elements of the portable media player 10, such as a pickup unit (not labeled), a spindle motor (not labeled), printed circuit boards (not shown) and the like, are received and fixed in the housing. The upper housing portion 1a comprises a main plate 11 at a top thereof. A round recess 12 is defined in the main plate 11 to receive a disc (not shown) therein. A catch opening 110 is defined at a front corner of the main plate 11. A clasping means (not shown) is formed under the catch opening 110.

The top lid 5 has a round protrusion 55 extending from an interior surface thereof. When the top lid 5 is rotated to a locked position where the top lid 5 covers the main body 1, the protrusion 55 extends into the recess 12 of the upper housing portion 1a of the main body to seal the recess 12 thereof. Corresponding to the catch opening 110 of the main body 1, a catch 51 extends downwardly from the interior surface of the top lid 5. The catch 51 can be clasped by and released from the clasping means of the main body 1 to close and open the top lid 5. A pair of coaxial barrels 52 with opposite blind holes (not labeled) therein is formed at two opposite ends of the rear edge of the top lid along the axis OO'. Distal ends of the first and second pivot sets 2, 3 are received in the barrels 52, thereby attaching the top lid 5 to the main body 1, which will be detailed hereinafter. An engaging surface 53 is defined at the rear edge of the lid body 5, beside one of the barrels 52. The engaging surface 53 cooperates with one of the first and second pivot sets 2, 3 during rotation of the top lid 5 relative to the main body 1, which will be also detailed hereinafter.

Figure 2:
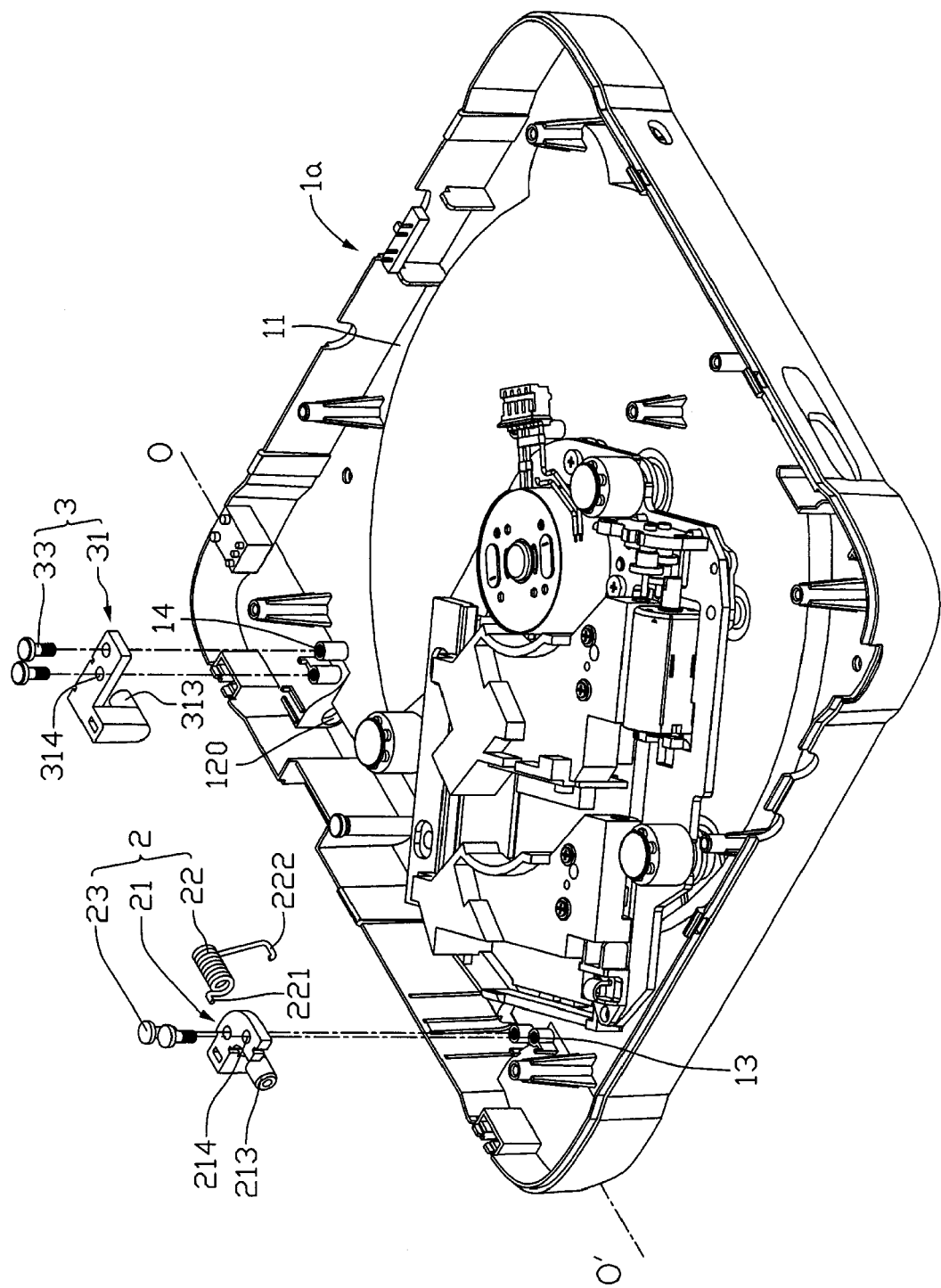
FIG. 2 is a partially exploded, isometric view of the upper housing portion, a first pivot set, and a second pivot set of FIG. 1, viewed from a bottom aspect.
Figure 3:
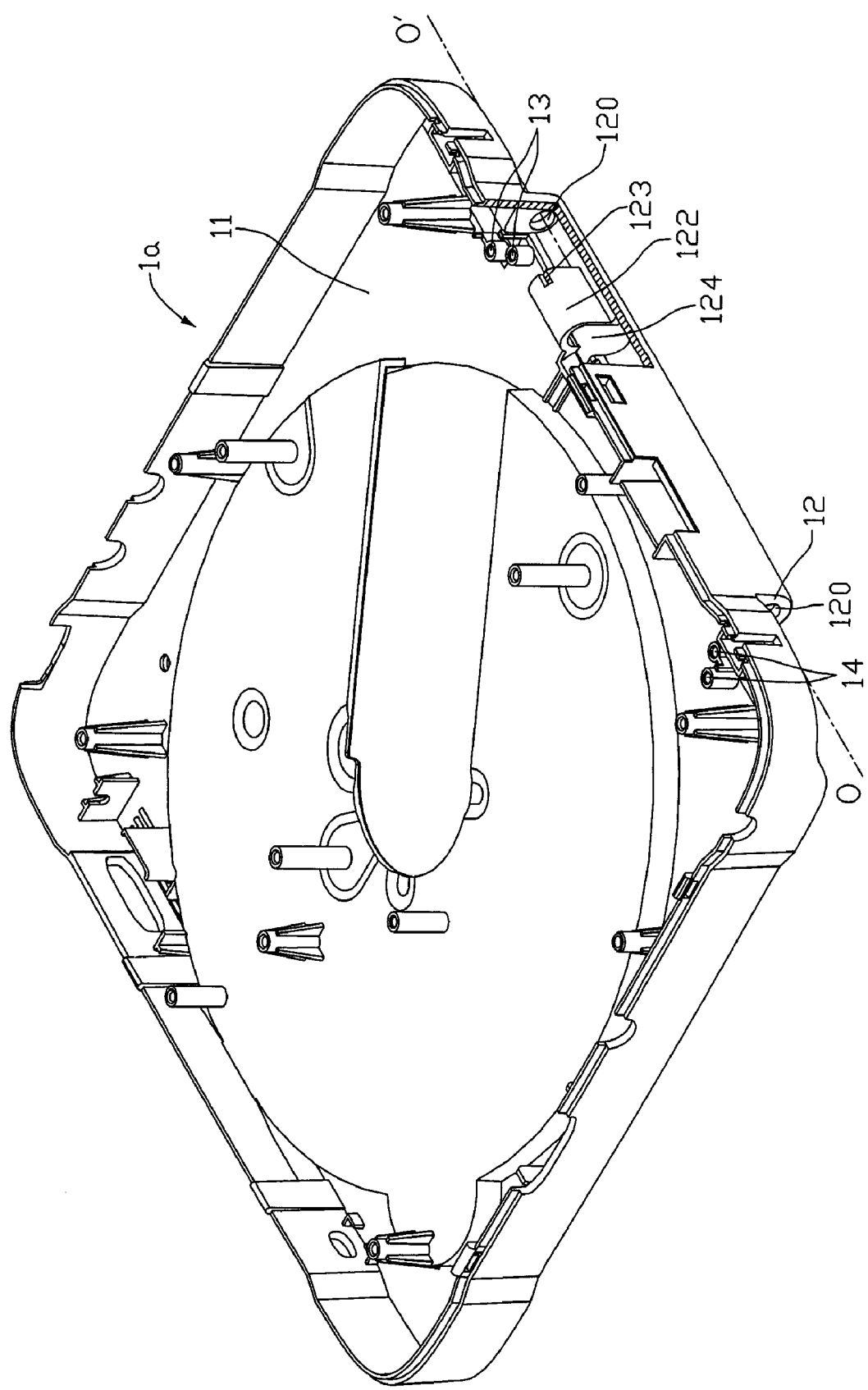
FIG. 3 is a partially cut-away, isometric view of the upper housing portion of FIG. 1 viewed from a bottom aspect.

Now referring to FIGS. 2 and 3, the first pivot set 2 includes a first pivot seat 21, a torsion spring 22, and a pair of securing elements such as screws 23. A pair of first mounting holes 214 is defined in the first pivot seat 21 to allow the first screws 23 to extend therethrough. A pair of first screw posts 13 is formed on the main plate 11 at a corner thereof, corresponding to the first mounting holes 214 respectively. The first screws 23 are used to extend through the first mounting holes 214 and into the first screw posts 13 respectively, for securing the first pivot seat 21 to the rear right corner of the upper housing portion 1a. A first pivot 213 extends horizontally and rightwardly from the first pivot seat 21. The torsion spring 22 includes two ends, i.e. a fixing end 221 and a sliding end 222. The fixing end 221 is fixed to the upper housing portion 1a, while the sliding end 222 protrudes up from the upper housing portion 1a to press on the engaging surface 53 of the top lid 5.

The second pivot set 3 includes a second pivot seat 31 and a pair of screws 33. A pair of second mounting holes 314 is defined in the second pivot seat 31 to allow the pair of second screws 33 to extend therethrough. Correspondingly, a pair of second screw posts 14 is formed on the main plate 11 at a rear left corner thereof. The second screws 33 are used to extend through the second mounting holes 314 and into the second screw posts 33 respectively, for securing the second pivot seat 31 to the rear left corner of the upper housing portion 1a. A second pivot 313 extends horizontally and leftwardly from the second pivot seat 31. The first and second pivots 213, 313 extend coaxially but in opposite directions, thereby defining the axis OO'.

The upper housing portion 1a has a sleeve 12 with a partially columnar profile at a general middle of the rear edge thereof. The sleeve 12 is formed by raising a rear edge portion of the upper housing portion 1a. The sleeve 12 is used to receive the first and second pivots 213, 313 of the first and second pivot set 2, 3 thereat. Two apertures 120 are coaxially defined at both ends of the sleeve 12, for the first and second pivots 213, 313 of the first and second pivot seats 21, 31 to extend therethrough. A spring housing 122 is formed at the rear edge of the upper housing portion 1a to receive the torsion spring 22 therein. A fixing hole 123 is defined in the spring housing 122 to fix the fixing end 221 therein. A gap 124 is defined in the sleeve 12, opposite to the spring housing 122, to allow the sliding end 222 of the torsion spring 22 to protrude therefrom, as shown in FIG. 4.

Figure 4:
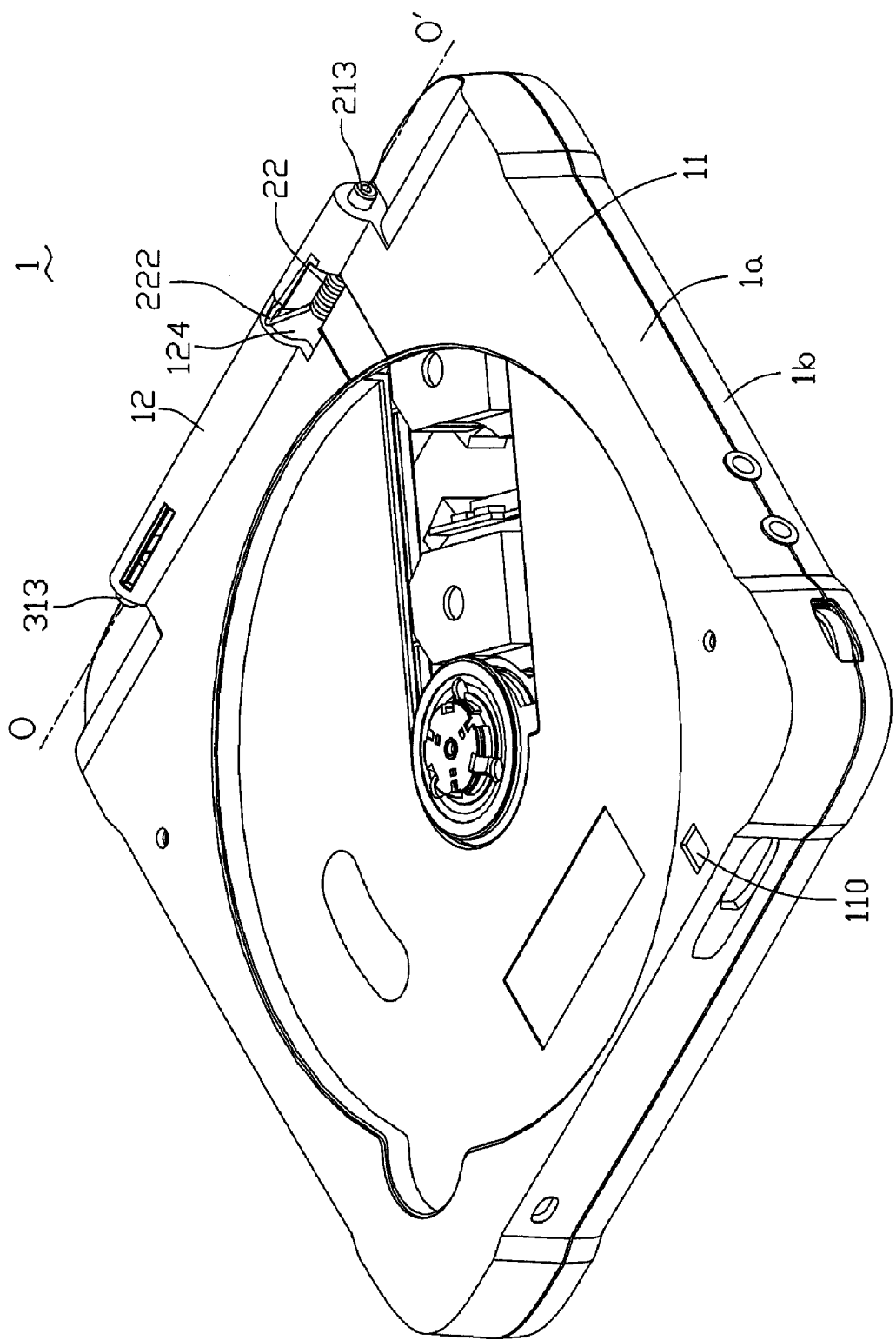
FIG. 4 is an isometric view of the main body of FIG. 1.
Figure 5:
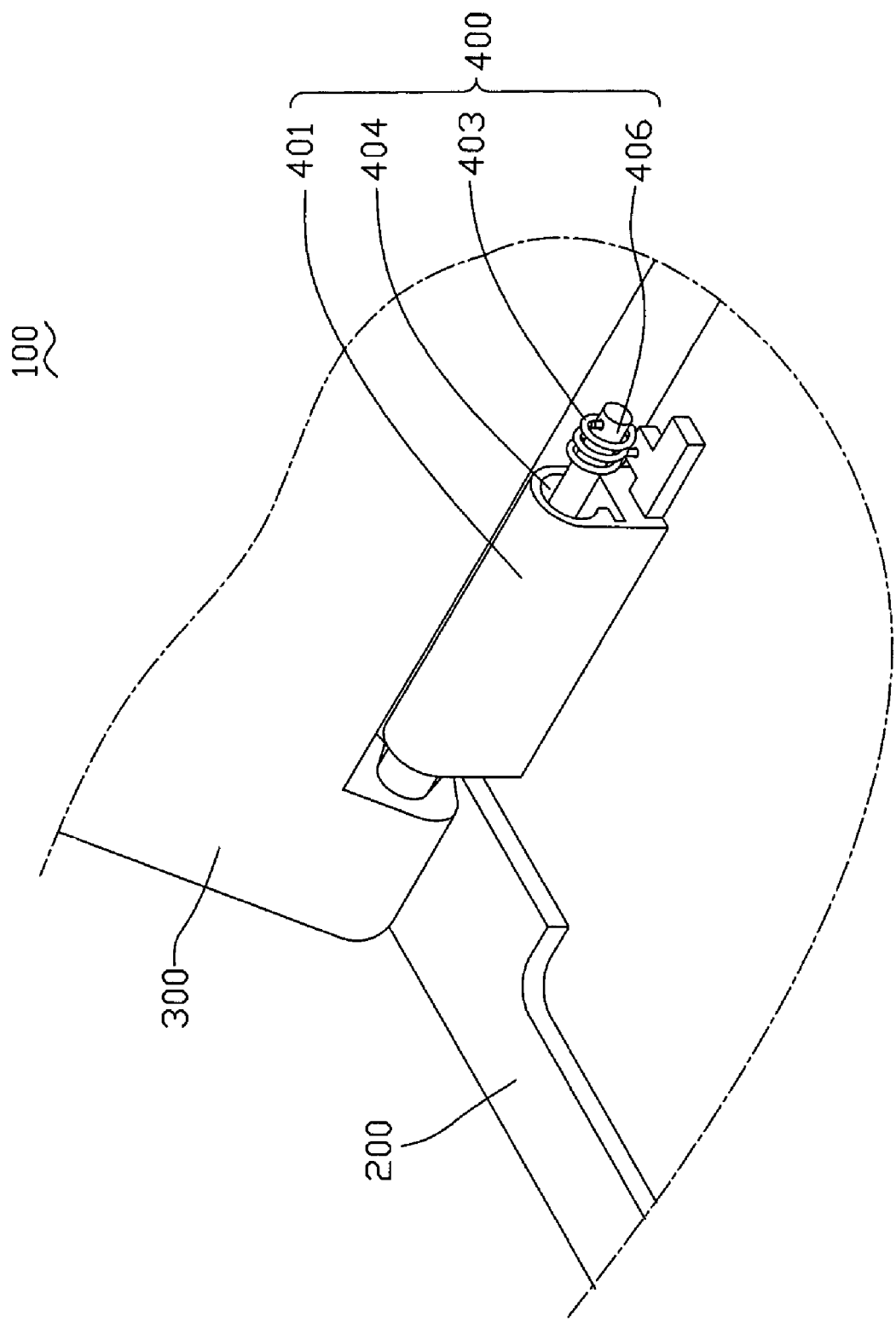
FIG. 5 is a partial view of a conventional hinge mechanism of a portable electronic device.

Referring also to FIG. 4, in assembly, the upper housing portion 1a of the main body 1 and the top lid 5 are mated together, with the main plate 11 of the upper housing portion 1a and the bottom of the top lid 5 being jointed. The first and second pivots 213, 313 of the first and second pivot seats 21, 31 are respectively extended into the blind holes of the barrels 52 of the top lid 5, thereby attaching the top lid 5 to the upper housing portion 1a of the main body 1. The first and second pivot seats 21, 31 are secured to the upper housing portion 1a using the first and second screws 23, 33 as described above, with the first and second pivots 213, 313 of the first and second pivot seats 21, 31 respectively extending through the apertures 120 of the sleeve 12. The first and second mounting holes 214, 314 of the first and second pivot seats 21, 31 and the first and second screw post 13, 14 of the upper housing portion 1a are respectively aligned, and the first and second screws 23, 33 are inserted into the first and second mounting holes 214, 314 and screwed into the first and second screw posts 13, 14, thereby fixing the first and second pivot seats 21, 31 to the upper housing portion 1a of the main body. The spring 22 is received in the spring housing 122, with the fixing end 221 thereof engaged into the fixing hole 123 of the spring housing 122, and the sliding end 222 thereof protruding through the gap 124 and pressing against the engaging surface 53 of the top lid 5. Finally, the lower housing portion 1b is screwed to or coupled to the upper housing portion 1a by other means, and the assembly of the player is thus accomplished.

When loading or unloading a disc to or from the portable media player 10, the clasping means is pressed to release the catch 51 of the top lid 5 therefrom. As the catch 51 is released, the top lid 5 is flipped away from the main body 1 to an open position due to a torsion force applied on the engaging surface 53 of the top lid 5 by the torsion spring 22. Therefore, the disc can be placed and/or replaced to and/or from the round recess. When the top lid 5 is forced down against the torsion force to the locked position where the top lid 5 covers the upper housing portion 1a of the main body 1, the catch 51 of the top lid 5 extends into the catch opening 110 and is clasped by the clasping means, thereby maintaining the top lid 5 in the locked positioned.

Obviously, the torsion spring 22 applies forces on the top lid 5 and the spring housing 122 of the main body 1. The mechanical robustness requirement for the first and second pivot sets is reduced. As the first and second pivot seats 21, 34 are detachably secured to the main body 1 of the portable media player 10, it is easy to mount the top lid 5 to the main body 1 as described in the assembly process. The above-mentioned hinge structure may also be applied to other portable electronic apparatus, such as a foldable communication device, a personal digital assistant, etc.

It should be emphasized that the above-described embodiments of the present invention, including any preferred embodiments, are merely possible examples of implementation of the principles of the invention, and are merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and be protected by the following claims.

What is claimed is:

1. An electronic apparatus comprising:
   a first body;
   a second body;
   a pivot set for hinging said second body to said first body, said pivot set comprising a pivot seat and a pivot extending from the pivot seat, said pivot seat being detachably secured to said first body, said pivot rotatably extending into said second body; and a torsion spring comprising a fixing end thereof fixed to said first body, and a sliding end thereof slidably pressing against said second body.

2. The electronic apparatus according to claim 1, wherein a spring housing is formed on said first body to receive said torsion spring therein.

3. The electronic apparatus according to claim 2, wherein the spring housing defines a fixing hole to fix said fixing end of said torsion spring therein.

4. The electronic apparatus according to claim 1, wherein an engaging surface is formed on said second body, against which the sliding end of said torsion spring slidably presses.

5. The electronic apparatus according to claim 1, wherein said pivot of said pivot set defines an axis, and said second body is rotatable around the axis relative to said first body.

6. The electronic apparatus according to claim 5, wherein said first body defines an aperture along the axis of said pivot, and the pivot extends through the aperture.

7. The electronic apparatus according to claim 5, wherein said second body forms a barrel along the axis of said pivot, and said barrel slidingly receives said pivot of said pivot set.

8. The electronic apparatus according to claim 1, further comprising a securing element to secure said pivot seat of said pivot set to said first body.

9. The electronic apparatus according to claim 8, wherein said pivot seat of said pivot set defines a mounting hole therein to allow said securing element to extend therethrough.

10. A foldable electronic apparatus comprising:
a main body comprising a housing having a raised rear edge portion thereof,
a pivot set comprising a pivot seat located in the housing below the raised rear edge portion, and a pivot extending from the pivot seat;
a lid comprising a barrel at a rear edge thereof, the barrel slidingly receiving the pivot therein so that the lid is pivotably attached to the main body; and
a spring member interposed between the main body and the lid, for resiliently loading the lid in a direction away from the main body.

11. The foldable electronic apparatus of claim 10, wherein the raised rear edge portion is formed by stamping the rear portion of the housing.

12. The foldable electronic apparatus of claim 10, wherein an aperture is formed in the housing at an end of the raised rear edge portion, the pivot extends through the aperture and into the barrel of the lid.

13. The foldable electronic apparatus of claim 10, wherein the raised rear edge portion forms a gap therein, and a spring housing is formed below the gap, and the spring member is received in the spring housing.

14. The foldable electronic apparatus of claim 13, wherein the spring member is a torsion spring having a sliding end and a fixing end, the fixing end is fixed to the spring housing, and the sliding end protruding through the gap and slidingly engaged with the lid.

15. The foldable electronic apparatus of claim 10, wherein the pivot set is attached to the housing by securing elements.

16. The foldable electronic apparatus of claim 10, wherein the spring member is spaced from the pivot set.

* * * * *

UNITED STATES PATENT AND TRADEMARK OFFICE
CERTIFICATE OF CORRECTION

PATENT NO. : 7,594,303 B2
APPLICATION NO. : 11/306443
DATED : September 29, 2009
INVENTOR(S) : Wang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 760 days.

Signed and Sealed this

Twenty-eighth Day of September, 2010

David J. Kappos
*Director of the United States Patent and Trademark Office*